United States Patent [19]

Dell'Eva et al.

[11] Patent Number: 4,946,281
[45] Date of Patent: Aug. 7, 1990

[54] LASER PROFILER FOR HIGH PRECISION SURFACE DIMENSIONAL GROUPING APPARATUS AND METHOD

[75] Inventors: Mark L. Dell'Eva, Schaumburg, Ill.; Chieh-Yi J. Yen, Rochester Hills; Jacob George, Mt. Clemens, both of Mich.

[73] Assignee: General Motors Corporation, Detroit, Mich.

[21] Appl. No.: 342,276

[22] Filed: Apr. 24, 1989

[51] Int. Cl.⁵ ............................................. G01B 11/24
[52] U.S. Cl. ......................................... 356/376; 356/1
[58] Field of Search .................................. 356/1, 376

[56] References Cited

U.S. PATENT DOCUMENTS

| | | | |
|---|---|---|---|
| 3,612,890 | 10/1971 | Cornyn et al. | 356/376 |
| 3,671,126 | 6/1972 | Erb | 356/1 |
| 4,355,904 | 10/1982 | Balasubramanian | 365/356 |
| 4,583,857 | 4/1986 | Grammerstorff et al. | 356/1 |

FOREIGN PATENT DOCUMENTS

| | | | |
|---|---|---|---|
| 62-299708 | 12/1987 | Japan | 356/376 |
| 2203833 | 10/1988 | United Kingdom | 356/376 |

OTHER PUBLICATIONS

Harding et al, "Hybrid, High Accuracy Structured Light Profiler", SPIE, vol. 728, Optics, Illumination, and Image Sensing for Machine Vision (1986).

*Primary Examiner*—Richard A. Rosenberger
*Attorney, Agent, or Firm*—Ernest E. Helms

[57] ABSTRACT

A laser optical profiler for determining the shape of a workpiece, the profiler in combination comprising means for projecting a laser probe line at a first fixed focal length on said workpiece at a first angle, means for providing relative movement between said probe line and said workpiece, imaging lens means for focusing on said workpiece at an angle nonspecular with respect to first angle at a second fixed focal length a receiver path to provide an image reflected off said workpiece, the reflected receiver path forming a line essentially coterminous with said probe line, the receiver path having a predetermined transverse width with alpha and beta portions, means to move said receiver path along with said probe line, a beam splitter means for dividing said receiver path into first and second portions, a first linear array of individual detectors associated with said first portion of said receiver path for detecting said alpha portion of said width of said receiver path and generating a signal in response thereto, a second linear array of individual detectors associated with said second part of said receiver path for detecting said beta portion of said width of said receiver path image and generating a signal in response thereto, and means for comparing said response of said first linear array with said response of said second linear array to determine the acceptability of said responses and means for detecting the linear location of the focal point of said probe line with respect to said workpiece whereby the profile of said workpiece is determined.

12 Claims, 3 Drawing Sheets

LASER PROFILER FOR HIGH PRECISION SURFACE DIMENSIONAL GROUPING APPARATUS AND METHOD

FIELD OF THE INVENTION

This invention relates generally to optical measuring devices and particularly to a laser measurement system for non-contact optical profiling of a workpiece.

DISCLOSURE STATEMENT

It is known in the art to project a collimated laser line on a workpiece and to sense the reflection thereof in determining the profile of the workpiece.

There were two major systems previously proposed to make optical measurements. The first method is shown and described in Balasubramanian U.S. Pat. No. 4,355,904, the disclosure of which is incorporated herein. The shortcoming of the Balasubramanian method is that it requires a high accuracy scanning system and scanning optics sharing a common optical path to perform the measurement. The scanning system and optics tend to be bulky and high cost. The mechanical scan time is also slow compared to that available with the second system which utilizes a linear detector array.

The second system is shown and described in an article titled "Hybird, High Accuracy Structured Light Profiler", co-authored by Kevin G. Harding and Kenneth Goodson of the Advanced Manufacturing Technologies Laboratory, Industrial Technology Institute, Ann Arbor, Michigan 48106 and published in SPIE Volume 728 Optics Illumination, and Image Sensing for Machine Vision (1986), the disclosure of which is incorporated herein (hereinafter referred to as the ITI optical guillotine system).

The ITI optical guillotine system illuminates the surface to be measured using a line of light incident on the subject at 45 degrees from the average normal to the surface. Viewing the subject, for example, in the case of cylindrical parts, along a direction perpendicular to the axis of the cylinder, a line of constant height (constant Y) in space is imaged onto a 4000 element linear detector array. The line of light is translated in the Z or depth direction (which will move the illumination in the Y direction on the object) using a position encoded translation stage. As the line of light sweeps past the section on the subject which is imaged onto the detector array, the points of intersection as indicated by the illuminated spots at specific X locations on the detector are correlated with the current Z position as read out from the translation stage encoder. The X position is read out directly to one part in 4000 from the detector array.

The distance from the source to the points of intersection with the line on the subject being viewed is constant. This means that a sharply focused line can be used to illuminate the subject, and the line will always be at best focus when it intersects the region on the subject being viewed by the detector array. It is not necessary to translate the source to obtain this constant distance relationship. The path length can be maintained constant and the motion of the beam isolated from vibrations or wobble in the stage through the use of a constant deviation mirror system. It is desirable not to move the source since any slight wobble of the source will become a large positional error on the subject by the magnification of the source to the subject, and as the beam pointing changes. The same concern for vibrations and wobble applies to the detector as well. Not translating the source also allows for mechanical isolation of the source and projection optics to prevent misalignment or failure of the source due to mechanical shock from vibrations.

The depth information (Z value for a given X on the subject) is read out from the encoded translation stage. Stages are available with accuracy to one micrometer (0.00004 inches), and speeds to ten inches per second (one sweep being required to build up a profile).

The ITI system utilizes a translator and a single linear detector array. By using only a single linear array, the ITI system cross-axis dimension must be inferred by performing binary or gray scale post processing on the data to determine the center pixel illuminated by the laser line as imaged onto the linear array. Because of the above, only objects which have highly sloped surfaces can be gauged accurately. If the object is flat, with respect to the projected laser line, then an unambiguous measurement of range cannot be made. Also, because post processing must be performed on each line of data, it was required to store data for each cross-axis line for each Z-axis position. Since the cross axis resolution may be on the order of 4,000 pixels and the Z-axis resolution on the order of 50,000 pixels, it is evident that the amount of storage or memory required is rather large. Also since post-processing would be required on each pixel, the amount of processing time is rather large.

SUMMARY OF THE INVENTION

To overcome the disadvantaqes of the aforementioned optical measuring systems, the present invention is brought forth. A preferred embodiment optical profiler of the present invention provides a projector which forms a sharply focused laser probe line in front of the device at a known and fixed distance. The imaging device comprised of a flat field lens and two linear detector arrays combined in a bi-cell type arrangement form an imaging plane coincident with the focus position of the laser line which is incident at a fixed angle. If an object surface is present at the intersection of the laser line plane and the imaging plane, energy will be reflected back toward the linear arrays. These arrays in essence are aligned parallel to each other and form a bi-cell arrangement such that the position of the laser line which is reflected off the part can be determined with high accuracy by comparing the relative signal strengths from the vertically adjacent pixels on the two linear arrays.

Since the measurement range is limited to a small distance around the intersection of the respective planes, both the projector and the imaging device are mounted on a common platform wherein a single axis translator moves the intersection line of the laser and of the linear arrays in a direction perpendicular to the line and to the workpiece. By moving the intersection line of the projector and the imaging planes in a common direction, it is possible to treat this intersection line as a common probe to measure the surface profile of a part. The measurement accuracy of the system along the translation axis is a function of the accuracy of the translating device itself. The cross axis accuracy is a function of the size of the linear array pixels and the magnification of the receiver optics. Since both the translator and the linear array resolution are on the order of microns, it is possible to make profiled measurements of parts to the same accuracy.

The invention solves the aforementioned shortcomings (speed, cost, storage requirements and post processing requirements) by using a bi-cell imaging arrangement to provide unambiguous cross-axis position data. The only moving part in the present invention proposed is a reflective device consisting of two connected mirrors which moves the intersection line of the projector and the receiver planes along the translation axis thus reducing cost. The present invention can significantly reduce the post processing memory requirements and increases the data processing speed by saving neighborhood data only where valid surface data is detected.

Advantages of the present invention are its ability to produce high-accuracy profile measurements using short cycle times in conjunction with high data rates, seven (7) megahertz. The preferred embodiment design of the present invention has only one moving component, two small mirrors joined to provide a single motion, thus making it possible to use a small translation system. The measurement method provides for data reduction by observing the incoming video data, and making a simple decision as to whether the data is valid thereby greatly reducing the post processing and data memory storage requirements as mentioned previously.

The result of the above advantages allows the optical profiler of the present invention to make very high resolution measurements at high speeds using only one moving component, which was not possible using previous profilers.

Alternatively, the present invention can be described as a scanning laser measurement system for measuring depthwise variations of surfaces relative to a focal plane of an optical system. Laser light is directed to a test surface, generally aligned with respect to the focal plane, through focusing optics. Some of the light from a beam spot is retro scattered from the test surface and reimaged along a path generally parallel to the receiver optical axis. Depthwise variations in the test surface with respect to the focal plane cause spatial displacements in the retrobeam relative to the receiver optical axis. The retrobeam is directed to a beam splitter and two charge coupled device (CCD) line-scan arrays. The arrays are used to intercept reflected and transmitted components of the retrobeam and the signal intensity of these components is measured and used to compute centroid values for the retrobeam on the beam splitter for various beam spots on the test surface. The computed centroid values are directly proportional to depthwise surface deviations from the focal plane. The beam is directed to various points on the test surface by the translator optical scanner. If the deviations in the test surface from the focal plane are so great that a retrobeam cannot be formed, the entire profiler optical system is translated until beam focus can be achieved and a retrobeam formed. The extent of translation is a coarse measurement of depthwise variations in the test surface relative to the focal plane, while the previously mentioned centroid values yield a fine measurement of depthwise variations relative to the focal plane.

It is an object of the present invention to provide an optical profiler apparatus and method of utilization thereof.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
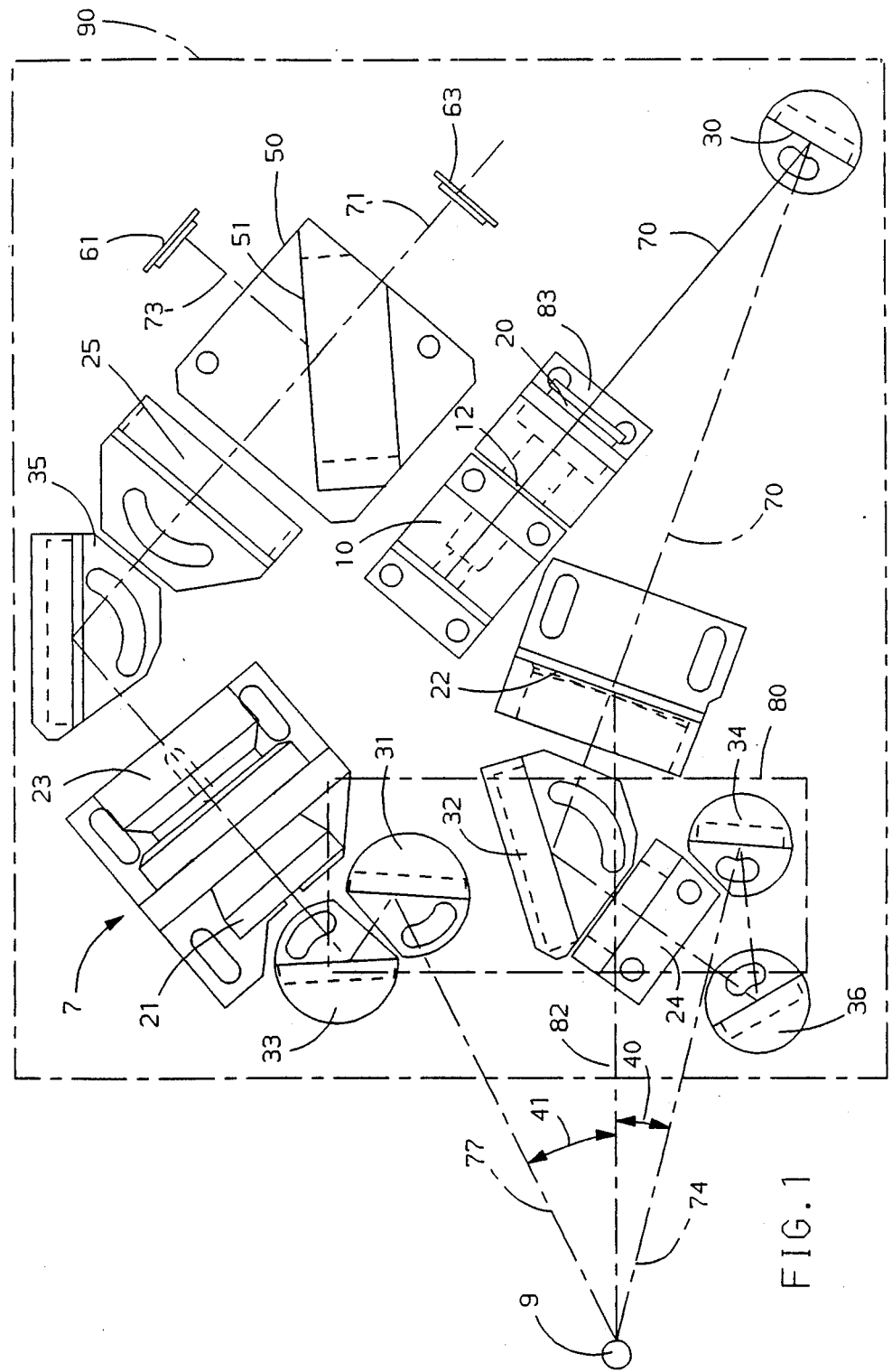
FIG. 1 is a top plane view of a preferred embodiment optical profiler according to the present invention.
Figure 2:
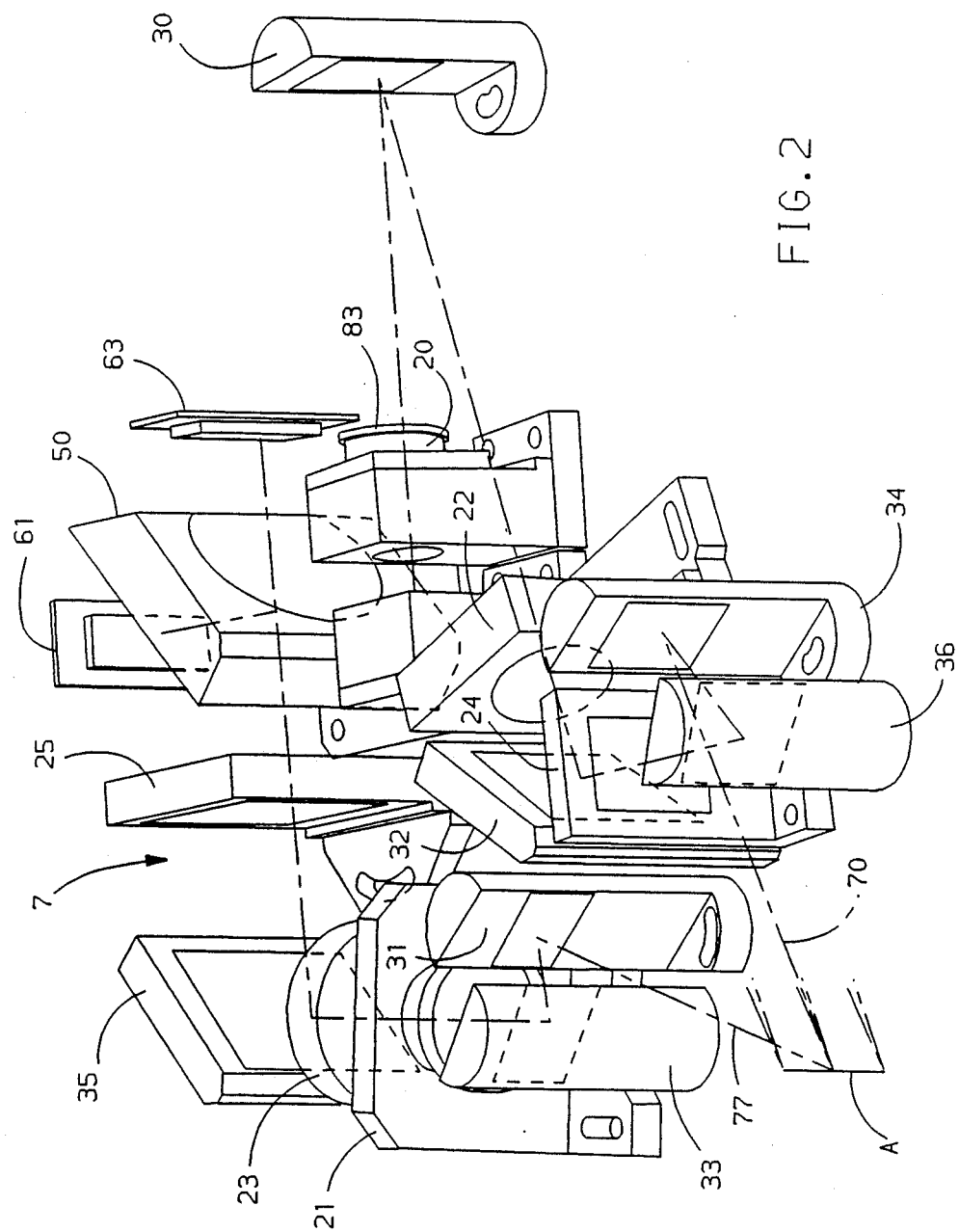
FIG. 2 is a perspective view of the profiler illustrated in FIG. 2.
Figure 3:
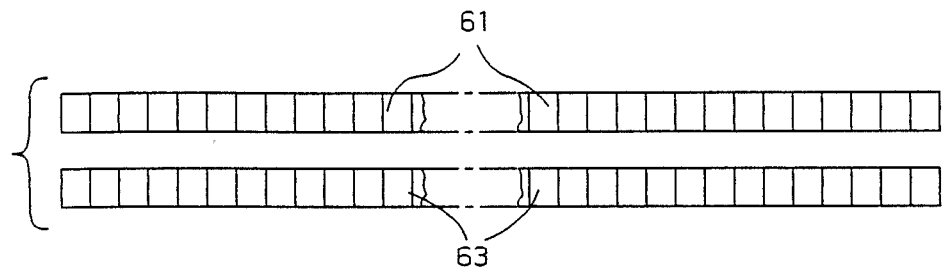
FIG. 3 is a schematic view of a linear array.
Figure 5:
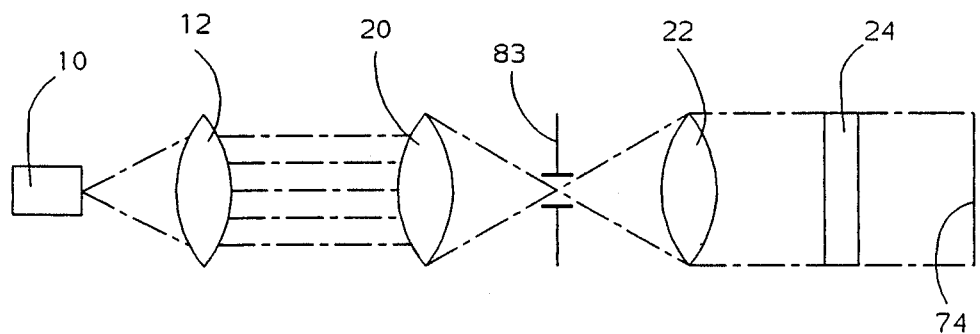
FIG. 5 is a schematic view of the projected beam.

Referring to FIGS. 1, 2 and 5, the optical profiler of the present invention 7 is contained within a casing 90 which has been removed for clarity of illustration. A laser projector 10 is provided along with a series of lenses and screens and mirrors to project a focused line 74 on a work piece 9 generally transverse to the work piece. The laser can be a continuous wave (CW) laser which allows the use of a lower power. Alternatively, a switched CW type laser can be used and operated at low duty cycle and moderate repetition rates. The switched low duty cycle method tends to reduce signal (or image) smear due to line translation. A wide range of laser wavelengths may be utilized, however, it has been found to be preferable to use a 850 nanometer semiconductor laser.

Due to the divergent nature of the beam from the laser, a lens 12 is used to collimate the beam. A two lens telescope consisting of a first achromatic lens 20, pin hole 83, mirror 30 and second achromatic lens 22 of the telescope are designed to expand, clear up and redirect the laser beam on its way to the workpiece. Mirror 32, cylindrical achromatic 24 are used to focus the laser beam (in one dimension) into a very narrow line 74 of laser light at a first predetermined fixed focal length. Mirrors 34 and 36 direct the transmitted beam to the workpiece. A laser line of approximately 30 millimeters×15 micrometers will appear on the workpiece 9.

To reiterate the above, after the projected laser line leaves the lens 24, the projected laser line will have a fixed focal length. To extend the focus of the laser line 74 through the object 9, mirror 34 will be translated by platform 80 along line 82.

Mirrors 31, 33 and 35, and lens 21 and filter 25 provide an imaging lens means for a focusing path on the workpiece at an angle 41 (typically 30°) which is non-specular with respect to angle 40 (typically 10°) at a fixed second focal distance relative to the workpiece 9. The lens 21 is a high quality 1:1 Nikon copy lens 122 mm focal length F5.6. The lens 21 exhibits a modulation transfer function of approximately 70 line pairs per millimeter of 30% modulation. It is consistent with the need for high resolution of the image. Filter 25 is a very narrow ten (10) nanometer, band pass filter designed to preclude image interference from ambient light. it is consistent with the narrow emission band of the laser.

Figure 4:
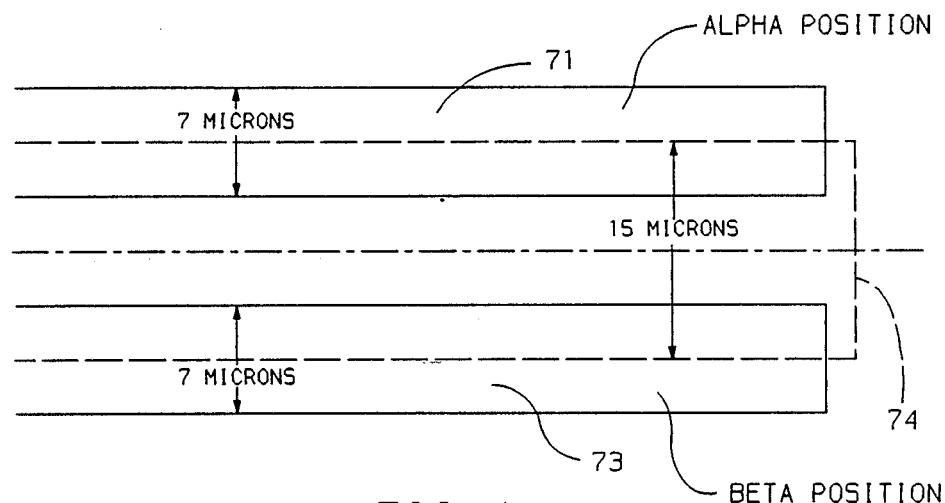
FIG. 4 is an enlarged view of the workpiece illustrating the projected laser beam and the images.

The receiver path (image) will generally be coterminous with the laser probe line where the laser probe line intersects the workpiece 9. The laser probe line typically will have a line width of 14 to 20 (15 microns as shown in FIG. 4) microns at the workpiece. The receiver path 77 will have an alpha portion 73 and a beta portion 71. As illustrated in FIG. 4, the alpha portion 73 is especially separated by a spacing 75 of approximately 8 microns from the beta portion 71. However, if desired, these portions may join without separation. It is desirable to make the probe line width as small as possible. However, the size of the pixel receivers, expenses of optics, and/or surface texture of the workpiece 9 limit reductions in probe line width.

Path (image) 77 is brought through beam splitter 51. The beam splitter 51 is typically a nitrocellulose type pellicle beam splitter which generally splits the beams into equal portions to a first linear detector array 61 and to a second linear detector array 63. To move the line formed by the intersection of the path 77 and the laser line 74 there is provided a mirror 31 which is also attached to the translation platform 80 and moves along therewith.

Each individual array of detectors typically has a line-scan CCD type detector having approximately 4000 photo detectors (pixels) per linear inch. A typical detector array is an NEC U PD 791 4096 array each pixel being 7 microns×5 microns with 2 microns dead spacing.

The detectors are typically laterally offset from the center line of the path 77 to provide an image with a center line offset from the center line of the beam projected laser line by 50% plus or minus 7% of the width of the projected laser line. As shown, the alpha 71 and beta portion 73 center lines are offset 7.5 microns from the path 77 center line and provide an image angle of 0.000894 degrees. The offset of the detector arrays provides the alpha 71 and beta 73 portions of the reflected beam 77.

In operation the distance of the platform 80 to the object 9 is known and is fed to a computer. Where the laser probe line intersects the surface area of the workpiece 9 an image will be impinged upon the detector arrays 61,63. In essence the detector arrays 61,63 will be lined up with one another. Where there is an acceptable image reading on both aligned and corresponding individual detectors (pixels) which are within a ratio 60 to 40 to one another the data will be stored. It is know that there is a location wherein the probe line is intersecting the surface of the workpiece. Therefore, to know exactly where the beam is intersecting the workpiece it is only necessary to provide a ratio analysis in the response of the aligned individual detectors of the first and second linear arrays. Those detectors not detecting any radiation or detecting radiation at the ratios outside the prescribed limits can be ignored. This allows the information on which detectors are being excited by acceptable amounts of reflected radiation to be sent to the computer, along with the information on the exact location of the translator 80 thus allows the controller to provide an accurate profile of the workpiece. At any given time, only certain pixel of the linear arrays will be activated depending on the profile of the workpiece. In alternative embodiments, alternative comparison techniques (such as a normalized ratio) can be used to determine acceptability of data based upon the reading of the aligned pixel receivers.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A laser optical profiler for determining the shape of a workpiece, said profiler in combination comprising:
   means for projecting a laser probe line at a first fixed focal length on said workpiece at a first angle;
   means providing relative movement between said probe line and said workpiece;
   imaging lens means for focusing on said workpiece at an angle nonspecular with respect to first angle at a second fixed focal length a receiver path to provide an image reflected off said workpiece, said reflected receiver path forming a line essentially coterminous with said probe line, said receiver path having a predetermined transverse width with alpha and beta portions;
   means to move said receiver path along with said probe line;
   a beam splitter means for dividing said receiver path into first and second portions;
   a first linear array of individual detectors associated with said first portion of said receiver path for detecting said alpha portion of said width of said receiver path and generating a signal in response thereto;
   a second linear array of individual detectors associated with said second part of said receiver path for detecting said beta portion of said width of said receiver path image and generating a signal in response thereto; and
   means for comparing said response of said first linear array with said second linear array to determine the acceptability of said responses and means for detecting the linear location of the focal point of said probe line with respect to said workpiece whereby the profile of said workpiece is determined.

2. A laser optical profiler as described in claim 1 wherein said means for comparing said first and second linear array responses includes a ratio analysis of said responses to determine the acceptability of said responses.

3. A laser optical profiler as described in claim 2 further including a translating mirror for projecting said receiver path and said laser probe line on said workpiece.

4. A laser optical profiler as described in claim 2 wherein said ratio of alpha to beta responsive signals is between 40/60 to 60/40.

5. A laser optical profiler as described in claim 1 wherein said laser is a switched laser.

6. A laser optical profiler as described in claim 1 having a nitro cellulose beam splitter.

7. A laser optical profiler as described in claim 1 wherein said alpha and beta portions of said image have a parallel separation band between them.

8. A laser optical profiler as described in claim 1 wherein at least one said path alpha portion is offset approximately 50 percent of the width of said laser probe line from a center line of said laser probe line.

9. A laser optical profiler for determining a shape of a workpiece, said profiler in combination comprising:
   means for projecting a laser probe line at a fixed focal length on said workpiece at a first angle;
   translating mirror means to move said probe line with respect to said workpiece;
   imaging lens means for focusing on said workpiece at an angle nonspecular with said first angle at a second fixed focal length a receiver path to provide an image reflected off said translating mirror workpiece via said imaging lens means forming a line coterminous with said probe line, said receiver path having a predetermined transverse width with longitudinal alpha and beta portions parallel spaced from one another;

a beam splitter means for dividing said receiver image into first and second parts;

a first linear array of individual detectors associated with said first part of said receiver image for detecting said alpha portion of the width of said image and generating a signal in response thereto;

a second linear array of individual detectors associated with said second part of said receiver image for detecting said beta portion of the width of said receiver image and generating a signal in response thereto; and means of computing a differential ratio of the response of said first and second linear arrays and for rejecting any response not within a ratio of 40/60 to 60/40 between said first and second linear arrays for determining the focal point to said probe line with respect to said workpiece and for determining the linear location of said translating mirror with respect to said workpiece whereby the profile of said workpiece is determined.

10. A profiler as described in claim 9 wherein said laser is a pulsating laser.

11. A non-contact method of determining a profile of a workpiece, said method in combination comprising:

projecting a laser probe line at a first fixed focal length on said workpiece at a first angle;

translating said probe line with respect to said workpiece;

focusing on said workpiece at an angle nonspecular with said first angle, a receiver path for providing an image forming a line coterminous with said probe line on said workpiece at a fixed second focal length, said receiver path having a predetermined transverse width with alpha and beta portions;

moving said receiver path along with said probe line;

splitting said receiver path into first and second parts;

detecting said image of said alpha portion of said receiver path with a first linear array from said first part of said receiver path and generating a signal in response thereto;

detecting said image of said beta portion of said receiver path with a second arrays from said second part of said receiver path and generating a signal in response thereto; and computing a normalized ratio of response to said first linear array with said second linear array for determining an intersection of said probe line with said workpiece and comparing said ratio with the linear position of said image with respect to said workpiece whereby the profile is of said workpiece is determined.

12. A method as described in claim 11 further including duty switching said laser.

* * * * *